United States Patent [19]

Burkhardt

[11] 4,446,962
[45] May 8, 1984

[54] CONVEYING DEVICE WITH PUSHER FINGERS

[75] Inventor: Gisbert Burkhardt, Reichenau, Fed. Rep. of Germany

[73] Assignee: Licentia Patent-Verwaltungs G.m.b.H., Frankfurt am Main, Fed. Rep. of Germany

[21] Appl. No.: 407,071

[22] Filed: Aug. 11, 1982

Related U.S. Application Data

[63] Continuation of Ser. No. 868,336, Jan. 10, 1978, abandoned.

[51] Int. Cl.³ .............................................. B65G 47/26
[52] U.S. Cl. .................................... 198/457; 198/461; 209/917; 271/314; 271/272
[58] Field of Search ............... 198/457, 580, 620, 626, 198/627, 628, 644, 726, 728, 732, 733, 604, 360, 370, 461, 579, 623, 504; 209/900, 917; 271/305, 314, 272-275

[56] References Cited

U.S. PATENT DOCUMENTS

| 2,016,268 | 10/1935 | Griffith | 198/604 |
|---|---|---|---|
| 3,100,564 | 8/1963 | Levy | 198/626 |
| 3,921,791 | 11/1975 | Bornfleth et al. | 198/836 |
| 3,938,650 | 2/1976 | Holt | 198/461 |
| 4,047,712 | 9/1977 | Burkhardt et al. | 271/305 |
| 4,122,940 | 10/1978 | Hoffmann | 198/504 |
| 4,147,252 | 4/1979 | Burkhardt | 209/900 |

FOREIGN PATENT DOCUMENTS

| 899174 | 10/1953 | Fed. Rep. of Germany | 198/733 |
|---|---|---|---|
| 49-82466 | 7/1974 | Japan | 198/626 |
| 410817 | 5/1934 | United Kingdom | 198/627 |

Primary Examiner—Joseph E. Valenza
Attorney, Agent, or Firm—Spencer & Frank

[57] ABSTRACT

A conveying device for rectangular substantially flat objects, for example, letters, including first and second conveyor sections each including a guide trough which defines a conveying path for the objects and supports a longitudinal edge of same, a direction changing conveyor section connecting the first and second sections together so that objects can be conveyed from the first to the second section, and a rotating pulling device having a plurality of pusher fingers mounted thereon for moving the fingers along the guide troughs of the first and second conveyor sections so as to move objects along the conveying path. The pulling device is mounted on a plurality of drums with one of these drums being disposed in the direction changing conveyor section and having a first contact surface for the pulling device. The directing changing conveyor section comprises a second contact surface on the drum within the direction changing conveyor section with the second contact surface having a greater radius than that of the first contact surface, an endless cover belt, and a plurality of rollers for supporting and guiding the cover belt so that it normally encloses and contacts the portion of the second contact surface in said direction changing conveyor section and so that it coacts with the guide troughs as an outer guide element for the objects in the transition regions between each of the first and second conveyor sections and the direction changing conveyor section, whereby the objects are held between the cover belt and the second contact surface and conveyed thereby through the direction changing conveyor section.

19 Claims, 8 Drawing Figures

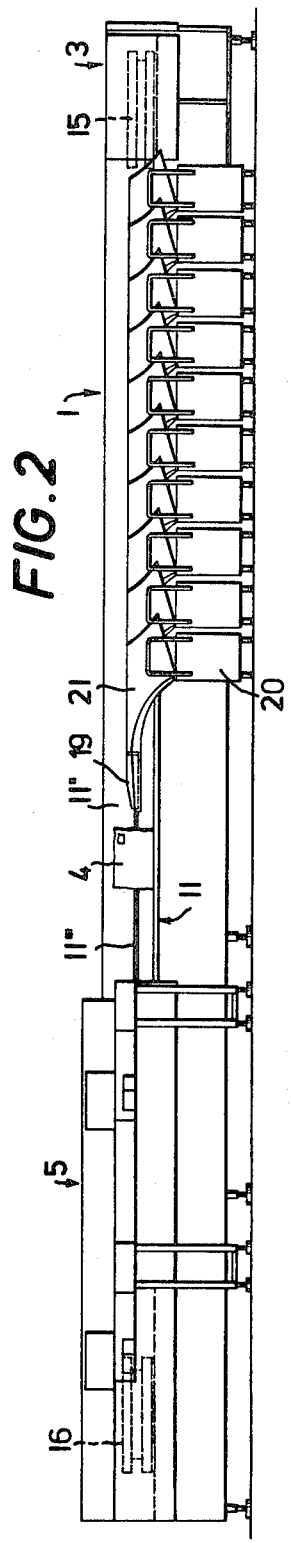
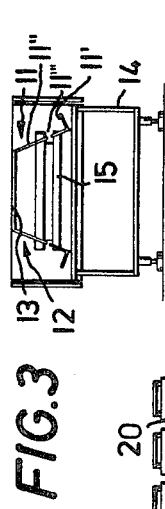
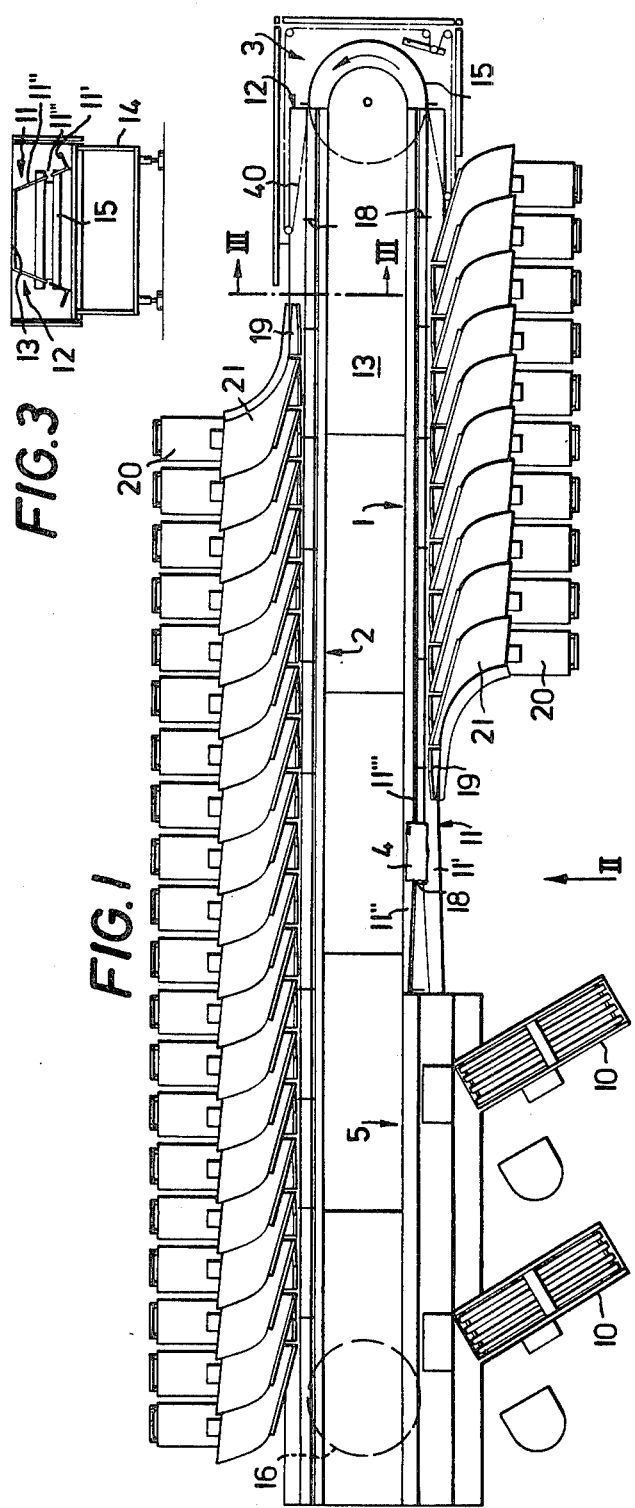

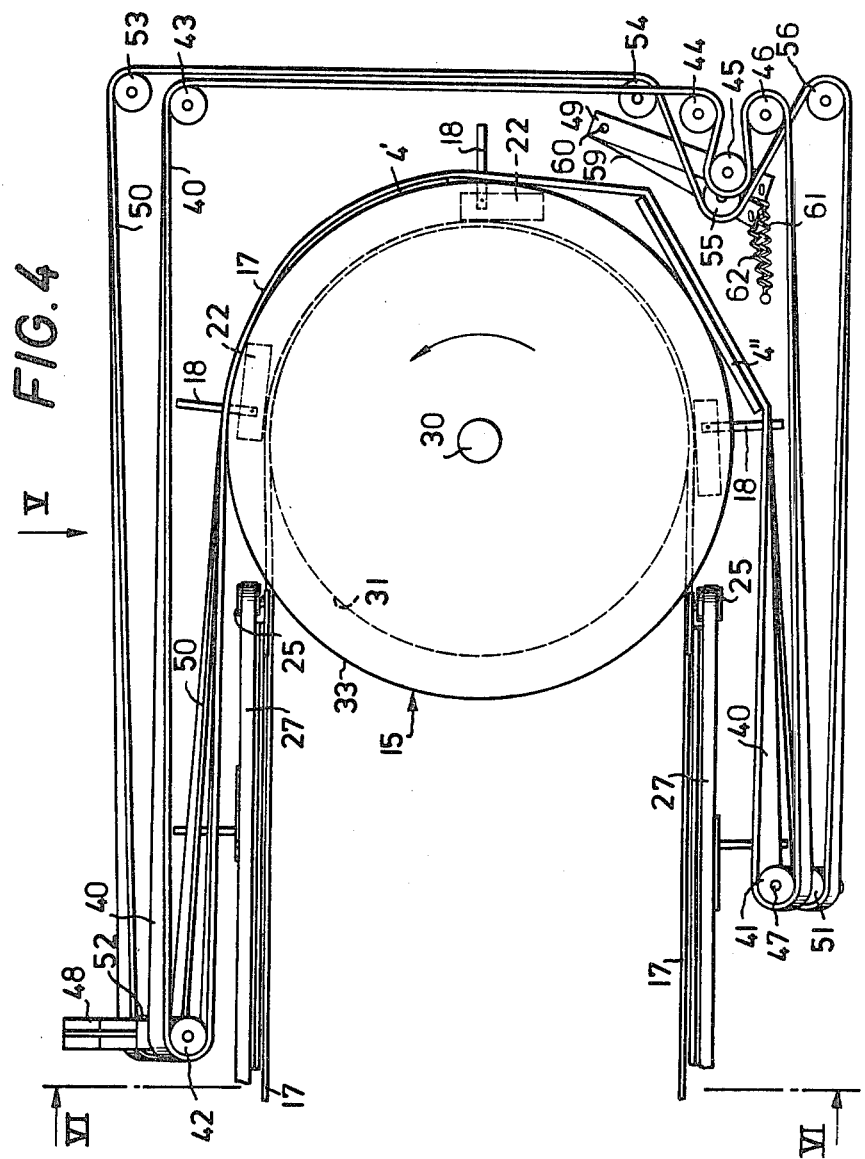

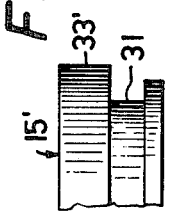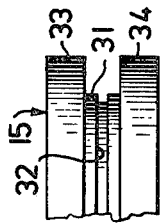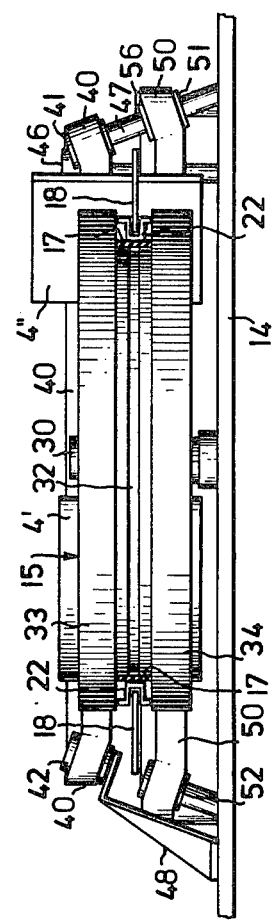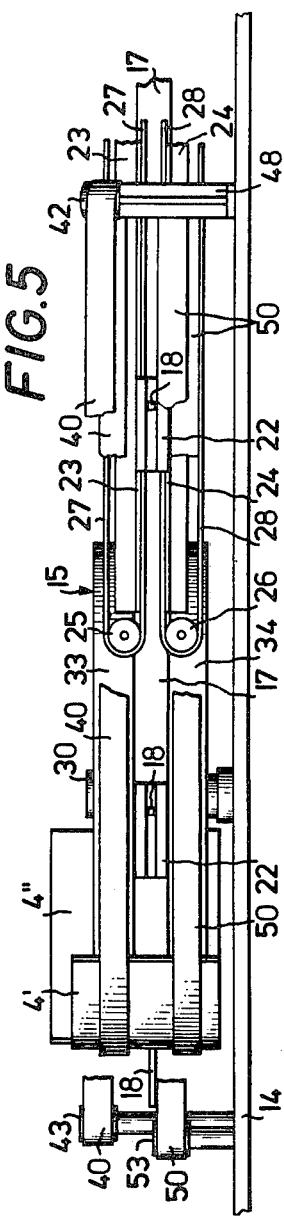

CONVEYING DEVICE WITH PUSHER FINGERS

CROSS REFERENCE TO RELATED APPLICATION

This application is a continuation of copending application Ser. No. 868,336 filed Jan. 10th, 1978 now abandoned.

BACKGROUND OF THE INVENTION

The present invention relates to a conveying device for rectangular, flat objects, such as letters in particular, comprising two conveying sections which are connected together by means of a direction changing conveyor section, and in which the longitudinal edges of the objects rest in a guide trough and are carried along by pusher fingers which are connected with a rotating pulling mechanism having one of its support or guide drums disposed in the direction changing conveyor section.

A conveying device having these features is disclosed, for example, in German Pat. No. 899,174, issued Dec. 10th, 1953, which shows, in FIGS. 7 and 8, a letter sorting mechanism having an input station and two groups of sorting deflectors arranged along the two conveying sections. The direction changing conveyor section according to the system disclosed in this patent is formed by a semicircularly bent trough having an approximately U-shaped profile, and the pusher fingers which act in the two linear conveying sections also serve as the drive member in the direction changing conveyor section.

The known conveying device is sufficiently dependable in operation only at a relatively slow conveying speed. In particular, malfunctions may occur in the direction changing conveyor section, for example, if objects are readily flexible or bendable in at least one direction.

SUMMARY OF THE INVENTION

It is the object of the present invention to provide a conveying device of the above-mentioned type which is suitable to handle stiff as well as limp, i.e. readily bendable, objects and operates dependably even at greater conveying speeds.

The above object is accomplished according to the present invention by providing a conveying device of the above mentioned type with a novel direction changing conveyor section. In particular, in a conveying device for rectangular substantially flat objects comprising first and second conveyor sections each including a guide trough which defines a conveying path for the objects and supports a longitudinal edge of same, a direction changing conveyor section connecting the first and second sections together so that objects can be conveyed from the first to the second section, and a rotating pulling means having a plurality of pusher fingers mounted thereon for moving the fingers along the guide troughs of the first and second conveyor sections so as to move objects along the conveying path with the pulling means being mounted on a plurality of drums one of which is disposed in the direction changing conveyor section and has a first contact surface for the pulling means; the direction changing conveyor section comprises: a second contact surface on the drum which is in the direction changing conveyor section with the second contact surface having a greater radius than that of the first contact surface; an endless cover belt; and means, including a plurality of rollers, for supporting and guiding the cover belt so that it normally encloses and contacts the portion of the second contact surface in the direction changing conveyor section and so that it coacts with the guide troughs as an outer guide element for the objects in the transition regions between each of the first and second conveyor sections and the direction changing conveyor section, whereby the objects are held between the cover belt and the second contact surface and conveyed thereby through said direction changing conveyor section.

According to a preferred embodiment of the invention the drum is provided with a third contact surface which is of the same radius as the second contact surface and is situated on the drum so that the first contact surface is between the second and third contact surfaces, and a further cover belt, which functions in a manner similar to the first cover belt, is provided for this third contact surface.

BRIEF DESCRIPTION OF THE DRAWINGS

FIG. 1 is a top view, partially schematic, of a conveyor-distributor apparatus for large-size items of mail including a conveying device according to the invention.

FIG. 2 is a side view in the direction of arrow II of FIG. 1.

FIG. 3 is a schematic cross-sectional view of only the conveyor portion of the apparatus taken along the line III—III of FIG. 1.

FIG. 4 is a schematic top view, to a larger scale, of the area surrounding the direction changing conveyor section of the apparatus according to FIGS. 1 to 3 with the guide troughs not illustrated for the sake of clarity.

FIG. 5 is a side view, partially broken away, in the direction of arrow V of FIG. 4.

FIG. 6 is a cross-sectional view along the line VI—VI of FIG. 4 with elements 25 and 27 not shown for the sake of clarity.

FIG. 7 is a partial side view of the return or support drum according to the invention shown in FIG. 6.

FIG. 8 is a partial side view of a modified further embodiment of a support or return drum according to the invention.

DESCRIPTION OF THE PREFERRED EMBODIMENTS

The basis of the embodiment of the conveyor-distributor device shown in FIGS. 1 to 3 is a conveying device having two generally linear conveying sections 1 and 2 which as shown are substantially parallel and which are connected together by means of a direction changing or return conveyor section 3.

The rectangular objects 4 to be distributed, e.g., letters, are fed into conveying section 1 at an intake region 5 equipped with two input stations 10. In conveying section 1 the objects 4 rest with one of their longitudinal edges, i.e., the lower edge, on a contact surface 11' of a guide trough 11 and have their surface area supported by the inclined side surface 11" of the guide trough 11 as best shown in FIG. 3. A corresponding guide trough 12 is disposed in conveying section 2. The area between the two guide troughs 11 and 12 is closed toward the top by a cover plate 13. The guide troughs 11 and 12 are fastened to the machine frame by means which are not shown. The machine frame as well as elements connected therewith, which serve mounting or fastening purposes, are shown only schematically in the drawings and are uniformly identified with the numeral 14.

Beneath the cover 13, an endless belt 17, which is shown only in FIGS. 4 to 6, is guided around a support or guide drum 15, which is disposed in the direction changing or return conveyor section 3, and a further guide drum 16, and is driven in the direction indicated by the arrow on drum 15 (FIG. 1). Connected with this belt 17, and extending through a slit 11''' in the side surface 11'' of the guide trough 11 and through a corresponding slit in guide trough 12, are a plurality of spaced pusher fingers 18 which produce the conveying drive for the objects 4 in both conveying sections 1 and 2.

Along the length of conveying sections 1 and 2, a plurality of selectively actuatable deflectors 19 are disposed with each deflector 19 being followed by a respective guide device 21 which leads to a respective movable stack container 20. The specific design of the above-mentioned elements 19 and 21 is described in detail, for example, in German Offenlegungsschrift (Laid-Open patent application) No. 25 23 835 corresponding to U.S. Pat. No. 4,047,712, issued Sept. 13, 1977 to G. Burkhardt et al and is not part of the present invention.

In the illustrated embodiment, the pusher fingers 18 are not directly fastened to the belt 17 which runs over the drums 15 and 16, but as shown in FIGS. 4–6 are each mounted on a support 22 which is connected with the belt 17. As shown in FIG. 5, pairs of rails 23 and 24 having mutually facing parallel slide surfaces are provided in the conveying sections 1 and 2, and serve to guide these supports 22 along the length of the guide troughs 11 and 12. In addition, each rail 23 and 24 has associated with it an endless belt 27 or 28, respectively, of wear resistant material. The belts 27 and 28 are guided around rollers 25 or 26, respectively, and each belt has one reach extending directly along the associated slide surface of rails 23 and 24 respectively, and coacting with the corresponding guide surface of supports 22. The details of the design of these elements 23–28 as well as the structural design of supports 22 are also not part of the present invention and, together with the advantages residing therein, are described, for example, in German Offenlegungsschrift No. 26 24 216 corresponding to applicant's U.S. patent application Ser. No. 800,919, filed May 26th, 1977, now U.S. Pat. No. 4,147,252 issued Apr. 3, 1979, the subject matter of which is hereby incorporated by reference.

As shown in FIGS. 4, 6 and 7, the drum 15 disposed in the direction changing or return conveyor section 3 is rotatably mounted on a shaft 30 and is provided with a first contact surface 31 over which the endless belt 17 bearing the pusher fingers 18 is guided. In the illustrated embodiment, and as particularly shown in FIGS. 6 and 7, this contact surface 31 is interrupted by an annular groove 32 in order to permit proper passage of elements which may protrude on the rear of belt 17 and are associated with supports 22, e.g. to fasten supports 22 to the belt 17.

As shown most clearly in FIG. 7, the drum 15 is provided with further contact surfaces 33 and 34, one on either side of contact surface 31, with both of these contact surfaces 33 and 34 having the same radius which is greater than that of contact surface 31. With the use of pusher fingers 18 mounted to supports 22 as in the illustrated embodiment, this radius of contact surfaces 33 and 34, as shown in FIGS. 4 and 6, is greater than the radial extent of a support 22 moving over surface 31 of drum 15.

Associated with the contact surface 33 is an endless cover belt 40 which is guided via guide rollers 41 to 46 so that it encloses the portion of the contact surface 33 which is in the section 3 and between the ends of the troughs 11 and 12 as shown in FIGS. 4 to 6. In the illustrated embodiment wherein the conveying sections 1 and 2 are linear and substantially parallel, the cover belts 40 and 50 enclose approximately one half of the circumference of the associated contact surfaces 33 and 34. Additionally rollers 41 and 42 which are rotatably mounted on a shaft 47 or a support 48, respectively, are arranged so that in the transition regions between the two conveying sections 1 and 2 and the drum 15, the cover belt 40 extends along a portion of the guide troughs 11 and 12 of the conveying sections 1 and 2 and coacts with the guide troughs 11 and 12 as an outer guide element for the objects 4 being conveyed. Since in FIGS. 4 to 6, the guide troughs 11 and 12 are not shown for reasons of clarity, this arrangement or function, respectively, can be seen in particular in FIG. 1, when a comparison is made with FIG. 4.

The contact surface 34 of drum 15 has associated with it a further corresponding endless cover belt 50 which is guided over guide rollers 51 to 56. As can be seen in FIGS. 4 and 5 in conjunction with FIG. 3, the running axles of guide rollers 41 and 51 as well as 42 and 52 are adapted with respect to their angle of inclination with respect to the vertical to the angle of inclination of the lateral surfaces, e.g., surface 11'', of the guide troughs 11 and 12, respectively, in order to properly function as the outer guide elements for the troughs 11 and 12.

According to a further advantageous feature of the invention the cover belts 40 and 50 are made to be resilient in length. This may be accomplished by forming the belts 40 and 50 of elastic material. Preferably as shown in FIG. 4 the resilience in length of the cover belts 40 and 50 is accomplished in that guide rollers 45 and 55 together with rollers 44 and 46 or 54 and 56, respectively, are mounted so that they act as tensioning rollers for the cover belts. For this purpose the rollers 45 and 55 are mounted respectively on levers 49 and 59, which are pivotal about a common axis 60 and which engage tension springs 61 or 62, respectively. In FIG. 5, the above-mentioned tensioning rollers, levers and tension springs and other components are not shown for the sake of clarity.

According to the invention, the direction changing or return conveyor section 3 of the illustrated embodiment is formed by the additional contact surfaces 33 and 34 of the support drum 15 for belt 17 and the cover belts 40 and 50 which enclose these contact surfaces 33 and 34 respectively and are guided in the above-described manner. When leaving the conveying section 1, the objects 4 are dependably guided into the range of action of contact surfaces 33 and 34 and their drive is transferred from the pusher fingers 18 to the above-mentioned contact surfaces 33 and 34 and belts 40 and 50. Even thin and limp objects, such as the object 4' shown in FIGS. 4 to 6, are carried along safely and without damage, and are transferred or conveyed to conveying section 2, between these contact surfaces 33 and 34 and the cover belts 40 and 50. Due to the resiliency of cover belts 40 and 50, the conveying device according to the invention is also suitable for processing thick and stiff objects, such as the illustrated object 4'' without malfunction, particularly since this resiliency can be reinforced as in the illustrated embodiment, by tensioning rollers unless suitable elastic cover belts 40 and 50 are being employed.

Although it is of advantage to provide the drum 15 with further contact surfaces 33 and 34 on both sides of the contact surface 31 intended for the belt 17, and to assign a cover belt 40 or 50 to each contact surface 33 or 34, the present invention also includes simpler embodiments. For example, one of the cover belts, such as cover belt 50, could be eliminated. FIG. 8 shows a modified embodiment of a drum 15' which has only one further contact surface 33' in addition to the contact surface 31 for belt 17. In such case only a single cover belt, such as cover belt 40 would be associated with the drum 15' and in particular the surface 33'.

It will be understood that the above description of the present invention is susceptible to various modifications, changes and adaptations, and the same are intended to be comprehended within the meaning and range of equivalents of the appended claims.

What is claimed is:

1. In a conveying device for rectangular substantially flat objects of varying dimensions comprising first and second horizontal conveyor sections each including a guide trough which defines a conveying path for the objects and supports a longitudinal edge of same, a direction changing conveyor section connecting said first and second sections together so that objects can be conveyed from said first to said second section, an orbiting pulling means, having a plurality of pusher fingers mounted on said pulling means, for moving said fingers along said guide troughs of said first and second conveyor sections so as to move objects along said conveying path, said pulling means being mounted on a plurality of drums which are mounted for rotation about respective vertical axes and with one of said drums being disposed in said direction changing conveyor section and having a first contact surface for said pulling means; the improvement wherein said direction changing conveyor section comprises: a second contact surface on said one of said drums, said second contact surface having a greater radius than that of said first contact surface and being disposed relative to said guide troughs so as to provide an object engaging surface in said direction changing conveyor section; an endless cover belt formed of an elastic material so as to be elastically yieldable with respect to its length; and means, including a plurality of rollers, for supporting and guiding said cover belt so that it normally encloses and contacts the portion of said second contact surface in said direction changing conveyor section and so that it extends along a portion of each of said guide troughs and coacts with same as an outer guide element for the objects in the transition regions between each of said first and second conveyor sections and said direction changing conveyor section to guide the objects from said guide trough of said first section into engagement with said portion of said second contact surface beneath said cover belt and from engagement with said portion of said second contact surface onto said guide trough of said second section, whereby the objects are held between said cover belt and said second contact surface and conveyed thereby through said direction changing conveyor section, and whereby, as the leading edge of an object is gripped between said second contact surface and the surface of said cover belt, the object is accelerated away from the associated said pusher finger, due to the difference in the circumferential speeds of the coacting gripping surfaces and of the pusher finger, in order to avoid undesired contact between the object and the pusher finger during travel through said direction changing conveyor section.

2. A conveying device as defined in claim 1 wherein: said pulling means is an endless belt; each of said pusher fingers is mounted on a respective support which is fastened to said endless belt; guide rails are provided for guiding said support along the length of said first and second conveyor sections; and the radius of said second contact surface is greater than the radial extent of said supports when moving over the surface of said drum.

3. A conveying device as defined in claim 1 further comprising: a third contact surface for said one of said drums, said third contact surface having a radius equal to that of said second contact surface and being located on said drum so that said first contact surface is between said second and third contact surfaces and so that said third contact surface provides a further object engaging surface in said direction changing section; a further endless cover belt; and means, including a further plurality of rollers, for supporting and guiding said further cover belt so that it normally encloses and contacts the portion of said third contact surface in said direction changing conveyor section and extends along a portion of said guide troughs and coacts with same as an outer guide element for the objects in the transition regions between each of said first and second conveyor sections and said direction changing conveyor section.

4. A conveying device as defined in claim 3 wherein said further cover belt is formed of an elastic material so as to be yieldable with respect to its length.

5. A conveying device as defined in claim 3 wherein said means for supporting and guiding said further cover belt includes means for applying tension to said further cover belt so that said further cover belt is yieldable with respect to its effective length in said direction changing conveyor section.

6. A conveying device as defined in claim 3 wherein: said pulling means is an endless belt; each of said pusher fingers is mounted on a respective support which is fastened to said endless belt; guide rails are provided for guiding said supports along the length of said first and second conveyor sections; and the radius of said second and third contact surfaces is greater than the radial extent of said supports when moving over the surface of said drum.

7. A conveying device as defined in claim 1 wherein said first and second conveyor sections are straight and substantially parallel and wherein said cover belt normally contacts approximately one half of the circumference of said second contact surface.

8. A conveying device as defined in claim 1 wherein said guide troughs each have a inclined horizontal support surface and an inclined vertical support surface for supporting the longitudinal edge and a rectangular surface respectively of an object being conveyed; and said means for supporting and guiding said cover belt supports and guides the portions of said belt which extends along said portions of said guide troughs so that they are parallel to the respective inclined vertical support surfaces of said guide troughs.

9. A conveying device as defined in claim 1 wherein the vertical height of said second contact surface is less than the vertical extent of the object to be conveyed, whereby said cover belt does not contact said second contact surface in the region of an object being conveyed by said direction changing conveyor section.

10. In a conveying device for rectangular substantially flat objects of varying dimensions comprising first and second horizontal conveyor sections each including a guide trough which defines a conveying path for the objects and supports a longitudinal edge of same, a direction changing conveyor section connecting said first and second sections together so that objects can be conveyed from said first to said second section, an orbiting pulling means, having a plurality of pusher fingers mounted on said pulling means, for moving said fingers along said guide troughs of said first and second conveyor sections so as to move objects along said conveying path, said pulling means being mounted on a plurality of drums which are mounted for rotation about respective vertical axes and with one of said drums being disposed in said direction changing conveyor section and having a first contact surface for said pulling means; the improvement wherein said direction changing conveyor section comprises: a second contact surface on said one of said drums, said second contact surface having a greater radius than that of said first contact surface and being disposed relative to said guide troughs so as to provide an object engaging surface in said direction changing conveyor section; an endless cover belt; and means, including a plurality of rollers, for supporting and guiding said cover belt so that it normally encloses and contacts the portion of said second contact surface in said direction changing conveyor section and so that it extends along a portion of each of said guide troughs and coacts with same as an outer guide element for the objects in the transition regions between each of said first and second conveyor sections and said direction changing conveyor section to guide the objects from said guide trough of said first section into engagement with said portion of said second contact surface beneath said cover belt and from engagement with said second contact surface onto said guide trough of said second section so that the objects are held between said cover belt and said second contact surface and conveyed thereby through said direction changing conveyor section, said means for supporting and guiding further including means for applying tension to said cover belt such that said cover belt is yieldable with respect to its effective length in said direction changing conveyor sections, whereby an object, upon being gripped between said second contact surface and said cover belt is accelerated away from the associated said pusher finger so as to avoid contact between the object and the pusher finger during travel through said direction changing section.

11. A conveying device as defined in claim 10 wherein: said pulling means is an endless belt; each of said pusher fingers is mounted on a respective support which is fastened to said endless belt; guide rails are provided for guiding said support along the length of said first and second conveyor sections; and the radius of said second contact surface is greater than the radial extent of said supports when moving over the surface of said drum.

12. A conveying device as defined in claim 10 further comprising: a third contact surface for said one of said drums, said third contact surface having a radius equal to that of said second contact surface and being located on said drum so that said first contact surface is between said second and third contact surfaces and so that said third contact surface provides a further object engaging surface in said direction changing section; a further endless cover belt; and means, including a further plurality of rollers, for supporting and guiding said further cover belt so that it normally encloses and contacts the portion of said third contact surface in said direction changing conveyor section and extends along a portion of said guide troughs and coacts with same as an outer guide element for the objects in the transition regions between each of said first and second conveyor sections and said direction changing conveyor section, said means for supporting and guiding said further cover belt further including means for applying tension to said further cover belt such that said further cover belt is yieldable with respect to is effective length in said direction changing conveyor section.

13. A conveyor device as defined in claim 12 wherein: said pulling means is an endless belt; each of said pusher fingers is mounted on a respective support which is fastened to said endless belt; guide rails are provided for guiding said supports along the length of said first and second conveyor sections; and the radius of said second and third contact surfaces is greater than the radial extent of said supports when moving over the surface of said drum.

14. A conveying device as defined in claim 10 wherein said guide troughs each have an inclined horizontal support surface and an inclined vertical support surface for supporting the longitudinal edge and a rectangular surface respectively on an object being conveyed; and said means for supporting and guiding said cover belt supports and guides the portions of said belt which extends along said portions of said guide troughs so that they are parallel to the respective inclined vertical support surfaces of said guide troughs.

15. A conveying device as defined in claim 10 wherein the vertical height of said second contact surface is less than the vertical extent of the object to be conveyed, whereby said cover belt does not contact said second contact surface in the region of an object being conveyed by said direction changing conveyor section.

16. A conveying device as defined in claim 1, wherein the radius of said second contact surface is greater than the radial extent of said pulling means when it is in contact with said first contact surface, whereby the objects being conveyed do not contact said pulling means when in contact with said second contact surface.

17. A conveying device as defined in claim 1, wherein said cover belt is driven solely by the rotation of said one of said drums.

18. A conveying device as defined in claim 10, wherein the radius of said second contact surface is greater than the radial extent of said pulling means when it is in contact with said first contact surface, whereby the objects being conveyed do not contact said pulling means when in contact with said second contact surface.

19. A conveying device as defined in claim 10, wherein said cover belt is driven solely by the rotation of said one of said drums.

* * * * *